United States Patent
Zhang et al.

(10) Patent No.: US 11,617,066 B2
(45) Date of Patent: Mar. 28, 2023

(54) METHOD AND DEVICE FOR NON-IP DATA DELIVERY IN COMMUNICATION SYSTEM

(71) Applicant: Telefonaktiebolaget LM Ericsson (PUBL), Stockholm (SE)

(72) Inventors: Yun Zhang, Guangzhou (CN); Jingrui Tao, Guangzhou Guangdong (CN); Fengpei Zhang, Guangzhou Guangdong (CN); Minyi Wang, Guangzhou Guangdong (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 25 days.

(21) Appl. No.: 17/258,690

(22) PCT Filed: Jul. 10, 2018

(86) PCT No.: PCT/CN2018/095097
§ 371 (c)(1),
(2) Date: Jan. 7, 2021

(87) PCT Pub. No.: WO2020/010508
PCT Pub. Date: Jan. 16, 2020

(65) Prior Publication Data
US 2021/0297834 A1    Sep. 23, 2021

(51) Int. Cl.
*H04L 12/26* (2006.01)
*H04W 4/70* (2018.01)
(Continued)

(52) U.S. Cl.
CPC ............ *H04W 4/70* (2018.02); *H04W 8/186* (2013.01); *H04W 80/02* (2013.01)

(58) Field of Classification Search
None
See application file for complete search history.

(56) References Cited

U.S. PATENT DOCUMENTS

2018/0343601 A1* 11/2018 Livanos ............ H04W 28/0867
2019/0090298 A1*  3/2019 Abraham .............. H04W 76/27
(Continued)

FOREIGN PATENT DOCUMENTS

| WO | 2017 003235 A1 | 1/2017 |
| WO | 2017 078485 A1 | 5/2017 |

(Continued)

OTHER PUBLICATIONS

3GPP TS 29.122 v15.0.0; Technical Specification; 3rd Generation Partnership Project; Technical Specification Group Core Network and Terminals; T8 reference point for Northbound APIs; (Release 15)—Jun. 2018.

(Continued)

*Primary Examiner* — Zewdu A Beyen
(74) *Attorney, Agent, or Firm* — Baker Botts L.L.P.

(57) ABSTRACT

The present disclosure provides a method and a device for non-IP data delivery in a communication system. The method for operating data by a network exposure node includes: receiving a request for operating the data; operating the data according to the request. The data includes a plurality of pieces of non-internet protocol data delivery (NIDD) data, which are buffered in a network and not delivered. The plurality of pieces of data already sent to the network exposure node may still be operated, for example cancelled or replaced, thus undesired actions of the UE may be better avoided.

21 Claims, 6 Drawing Sheets

(51) Int. Cl.
*H04W 8/18* (2009.01)
*H04W 80/02* (2009.01)

(56) References Cited

U.S. PATENT DOCUMENTS

2019/0166016 A1* 5/2019 Livanos ................ H04L 67/322
2019/0380060 A1* 12/2019 Huang .............. H04W 28/0268

FOREIGN PATENT DOCUMENTS

WO 2017 102748 A1 6/2017
WO 2017 167603 A1 10/2017

OTHER PUBLICATIONS

3GPP TSG-CT WG3 Meeting #97; Osaka, Japan; Pseudo CR; Title: NAPS, NIDD cleanup; Source: Ericsson (C3-183348)—May 21-25, 2018.

European Searh Report issued for Application No./Patent No. 18925740.5-1218 / 3821675 PCT CN2018095097—dated Jan. 20, 2022.

3GPP TS 23.682; Technical Specification; 3rd Generation Partnership Project; Technical Specification Group Services and System Aspects; Architecture enhancements to facilitate communications with packet data networks and applications (Release 15)—Sep. 2017.

3GPP TS 29.122 v0.4.0; Technical Specification; 3rd Generation Partnership Project; Technical Specification Group Core Network and Terminals; T8 reference point for Northbound APIs (Release 15)—Dec. 2017.

3GPP TSG-CT WG3 Meeting #97; Osaka, Japan; Pseudo CR; Title: NAPS, NIDD configuration patch and cleanup; Source: Ericsson (C3-183625)—May 21-25, 2018.

PCT Notification of Transmittal of the International Search Report and the Written Opinion of the International Searching Authority, or the Declaration issued for International application No. PCT/CN2018/095097—dated Mar. 29, 2019.

* cited by examiner

METHOD AND DEVICE FOR NON-IP DATA DELIVERY IN COMMUNICATION SYSTEM

PRIORITY

This nonprovisional application is a U.S. National Stage Filing under 35 U.S.C. § 371 of International Patent Application Serial No. PCT/CN2018/095097 filed Jul. 10, 2018 and entitled "METHOD AND DEVICE FOR NON-IP DATA DELIVERY IN COMMUNICATION SYSTEM" which is hereby incorporated by reference in its entirety.

TECHNICAL FIELD

The present disclosure relates generally to the technology of communications, and in particular, to a method and a device for non-IP data delivery in a communication system.

BACKGROUND

In a communication system, non-IP technology is used to reduce the occupation of network resources, such as internet protocol (IP) addresses. With this non-IP technology, a terminal device, such as a user equipment (UE) does not need an IP address to exchange data with the network. The non-IP data delivery (NIDD) may be used to handle both mobile originated (MO) and mobile terminated (MT) communication with UEs, wherein "MO" and "MT" are considered from the evolved packet system (EPS) standpoint.

A piece of NIDD MT data may be originated from a server node in the communication system, such as an application server or a service capability server (AS/SCS) or an application function (AF) node device, and terminated at a UE. In order to reach the UE, the AS/SCS or AF may access the network functions about non-IP data delivery, which are exposed by a network exposure node, such as a service capability exposure function (SCEF) node or a network exposure function (NEF) node. The server node and the network exposure node are independent nodes, and they may work cooperatively to deal with NIDD data. In the 3rd generation partnership project technical specification 23.682 (3GPP TS 23.682) V15.4.0 and 3GPP TS 29.122 V2.0.0, the procedure about how to access such functions through the network exposure node (SCEF) is described.

However, according to such technical specification, the piece of NIDD MT data is considered similarly as short message service (SMS) MT delivery. If a UE is in a power saving mode (namely, unreachable), the AS/SCS may continuously deliver repeated data to the SCEF for buffering. Moreover, there is no way to delete or replace more than one piece of NIDD data at one time. After such repeated data is sent to the SCEF, it is hard for the AS/SCS to operate such data again. Some repeated or inappropriate messages cannot be cancelled or replaced, and the UE may perform unwanted actions due to these messages. There is room for improving functions for NIDD.

SUMMARY

It is therefore an object of embodiments of the present disclosure to provide a method and a device for operating the data includes a plurality of pieces of NIDD data, which are buffered and not delivered in a communication system.

According to a first aspect of the disclosure, there is provided a method for operating data by a network exposure node in a communication system. The method includes receiving a request for operating the data and operating the data according to the request. The data includes a plurality of pieces of NIDD data, which are buffered in a network and not delivered.

In some embodiments, the plurality of pieces of NIDD data includes all pieces of NIDD data corresponding to a transaction identifier included in the request.

In some embodiments, operating the data according to the request including: deleting all the pieces of NIDD data corresponding to the transaction identifier.

In some embodiments, operating the data according to the request including: replacing all the pieces of NIDD data corresponding to the transaction identifier with another piece of NIDD data.

In some embodiments, the request is received via a T8 interface, and the transaction identifier is a configuration identifier (configurationID).

In some embodiments, the method further includes sending a response to the request to a server node.

In some embodiments, the network exposure node is one of: a service capability exposure function (SCEF) node, and a network exposure function (NEF) node.

In some embodiments, an originator of the plurality of pieces of NIDD data is one of: an application server (AS) node, a service capability server (SCS) node, and an application function (AF) node.

In some embodiments, a terminator of the plurality of pieces of NIDD data is a user equipment.

In some embodiments, a terminator of the plurality of pieces of NIDD data is a group of user equipment.

According to a second aspect of the disclosure, there is provided a method for operating data by a server node in a communication system. The method includes: sending a request for operating the data to a network exposure node. The data includes a plurality of pieces of NIDD data, which are buffered in a network and not delivered.

In some embodiments, the plurality of pieces of NIDD data includes all pieces of NIDD data corresponding to a transaction identifier included in the request.

According to a third aspect of the disclosure, there is provided a network exposure node device. The network exposure node device includes a processor and a memory containing instructions executable by the processor. The network exposure node device is operative to perform the method according to the first aspect of the present disclosure.

In some embodiments, the network exposure node device is one of: an SCEF node device, and an NEF node device.

According to a fourth aspect of the disclosure, there is provided a server node device. The server node device includes a processor and a memory containing instructions executable by the processor. The server node device is operative to perform the method according to the second aspect of the present disclosure.

In some embodiments, the server node device is one of an AS node device, an SCS node device, and an AF node device.

According to a fifth aspect of the disclosure, there is provided a computer readable storage medium having a computer program stored thereon. The computer program is executable by a device to cause the device to carry out the method according to the first aspect of the present disclosure.

According to a sixth aspect of the disclosure, there is provided a computer readable storage medium having a computer program stored thereon. The computer program is executable by a device to cause the device to carry out the method according to the second aspect.

It is an advantage that improved functions are provided for operating data including a plurality of pieces of NIDD data, which are buffered in a network and not delivered. The plurality of pieces of data already sent to the network exposure node may be operated, for example cancelled or replaced, thus undesired actions of the UE may be better avoided. The energy in network and UE is saved.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
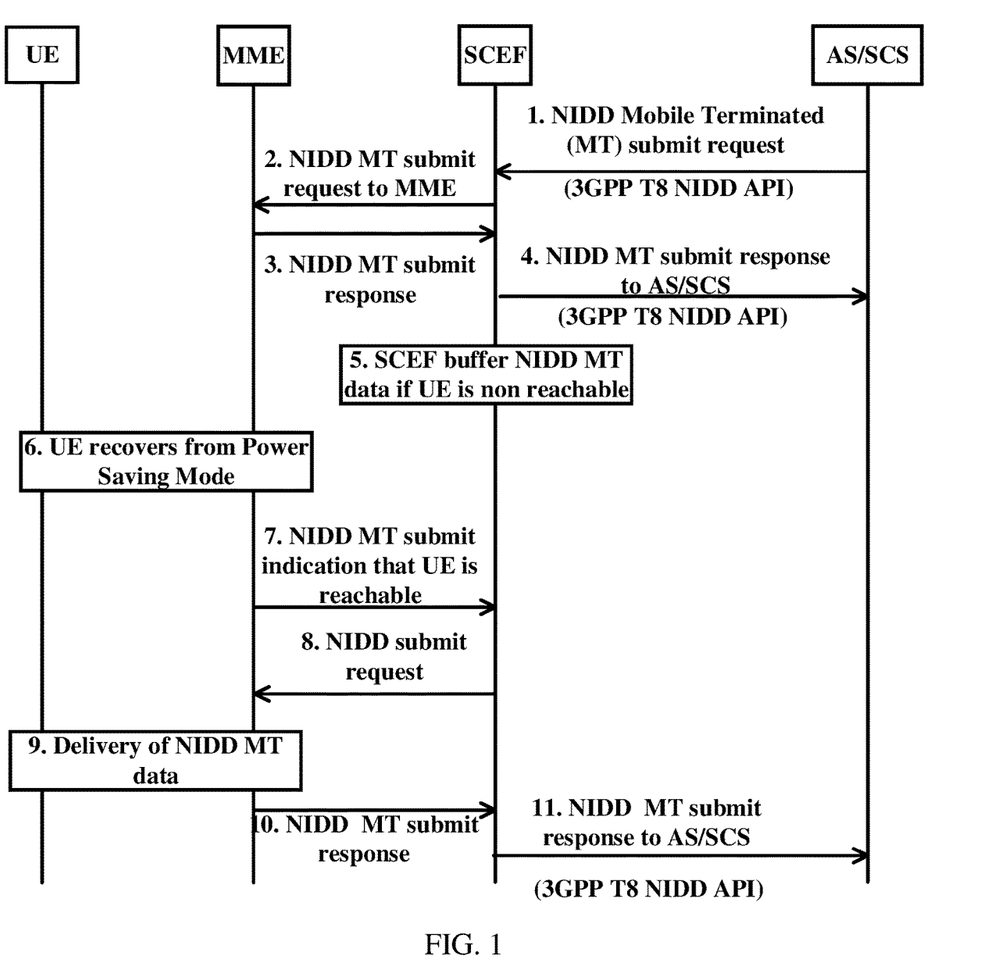
FIG. 1 is an exemplary procedure diagram about non-IP data delivery in a communication system.

FIG. 1 is an exemplary procedure diagram about non-IP data delivery in a communication system. As shown in FIG. 1, a procedure about non-IP data delivery from an AS/SCS to a UE, namely NIDD MT, is illustrated for example.

In step 1, when an SCS/AS has already activated the NIDD service for a given UE, and has downlink non-IP data to send to the UE, the SCS/AS sends an NIDD MT submit request (including: external identifier or MSISDN for the UE, downlink data delivery identifier, non-IP data, etc.) message to the SCEF. The UE in FIG. 1 may represent a user equipment or a group of user equipment. MSISDN refers to mobile subscriber international ISDN/PSTN number, wherein ISDN/PSTN refers to public switched telephone network/integrated services digital network. T8 in FIG. 1 refers to the interface between the SCEF and the SCS/AS. In particular, T8 means a reference point between the SCEF and the SCS/AS that is the Northbound APIs of 3GPP Core Network. The API refers to an application programming interface. In step 2, the SCEF checks whether the SCS/AS is authorized to send NIDD submit requests and that the SCS/AS has not exceeded the pre-defined service level agreement, e.g. a quota (e.g. 200 bytes in 24 hrs) or a rate (e.g. 10 bytes/hour) of data submission to the SCEF. In step 3, the SCEF sends a NIDD submit request (including: User Identity, EPS Bearer ID, SCEF ID, non-IP data, SCEF Wait Time, Maximum Re-transmission time) message toward the MME. The EPS refers to an evolved packet system. The ID refers to an identifier number. The MME refers to a mobile management entity. In step 4, the SCEF sends an NIDD MT Submit Response (including: downlinkDataDeliveryId, Requested Re-Transmission time, Cause) to the SCS/AS informing of the received results from the MME/SGSN. The downlinkDataDeliveryId refers to a downlink data delivery identifier. The SGSN refers to a serving GPRS support node, with similar functions to the MME, wherein the GPRS refers to general packet radio service.

In step 5, if the UE is not reachable (e.g. the UE is in power saving mode), the SCEF buffers the NIDD MT data. Alternatively, if the UE is reachable, the procedure goes to step 9 directly, and the NIDD MT data is delivered.

In step 6, the UE recovers from power saving mode, to be reachable. In step 7, the MME notifies the SCEF that the UE is on reachability for data. In step 8, the SCEF sends the NIDD MT data to the UE via the MME. In step 9, the MME delivers NIDD data over non-access stratum (NAS). In step 10, the MME notifies the SCEF about the result of the delivery of the NIDD MT data. In step 11, the SCEF responses to the AS/SCS that the delivery of the NIDD MT data is successful via T8 APIs.

In steps 1, 4, 11, the communications between the SCEF and AS/SCS are accomplished via 3GPP T8 NIDD APIs, so as to improve unity and security.

In a low power wide area network (LPWAN), at most of cases, a UE (e.g. an Internet of Things (IoT) device) will be in power saving mode (PSM) for keeping a long battery lifetime. NIDD MT data will be buffered in the network, and only delivered to the UE when the UE is active from PSM.

AS/SCS will probably send a number of MT data when UE sleeps in PSM. However, sometimes AS may expect only the last message to be effective in UE, and want to cancel all previous non-delivery message(s). For example, a water meter AS may send the remote closure command to the meter when the household has not enough balance for water supply. Since the water meter is set to be active in 1 day or several days, the closure command will not be delivered on time, the AS will continuously send a couple of closure commands to the meter, and these commands are buffered in the network. Later, the household may fill in money before the water meter is active from PSM. The water meter should remain open to supply water to the household. However, all the buffered commands including open command and several closure commands are sent to the water meter as soon as the water meter is active. Unexpected actions will then happen. The water meter may be closed, or may be repeatedly closed and open. The final state of the water meter will be unexpectable. The water meter AS will expect to cancel all non-delivered messages such as the closure commands, or just replace all non-delivered messages by the continuously supplying water command. However, in a conventional network, there is no way to delete or replace all these non-delivered messages at one time.

Such improved methods and devices for operating buffered data including non-IP data delivery in communication system will be described below in detail.

Figure 2:
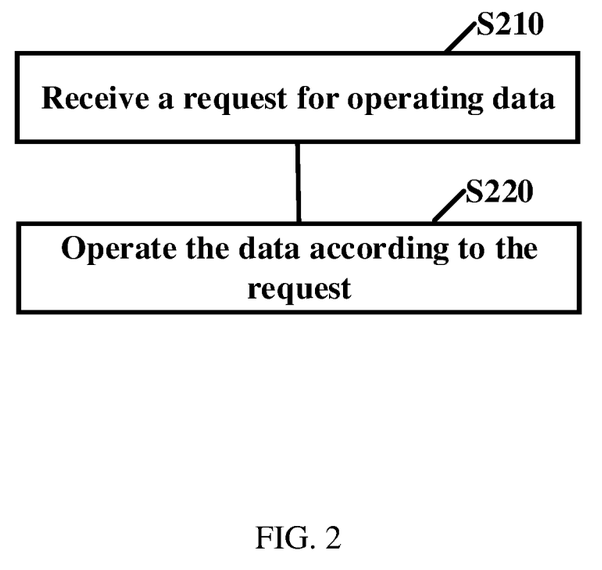
FIG. 2 is an exemplary flow chart showing a method for operating buffered data including non-IP data delivery in communication system according to embodiments of the present disclosure.

FIG. 2 is an exemplary flow chart showing a method for operating buffered data including non-IP data delivery in a communication system according to embodiments of the present disclosure.

As shown in FIG. 2, the method includes: step S210, receiving a request for operating the data and step S220, operating the data according to the request. The data includes a plurality of pieces of NIDD data, which are buffered in a network and not delivered. One piece of NIDD data may include all data from an originator to a terminator during one NIDD procedure. The method may further include: sending a response to the request to a server node.

The method of the present disclosure provides functions about how to operate data including a plurality of pieces of NIDD data, which are buffered in the network and not delivered. Particularly, the NIDD data may be buffered in the network exposure node, or a specific storage node associated with the network exposure node, which could be separate from or integrated into the network exposure node. The plurality of pieces of NIDD data already sent to the network exposure node may still be cancelled or replaced, thus undesired actions of the UE may be better avoided. Referring to the example about water meter again, only the last open command is received by the water meter, since the previous closure commands are cancelled explicitly. The state of the water meter will thus be predictable.

Figure 3:
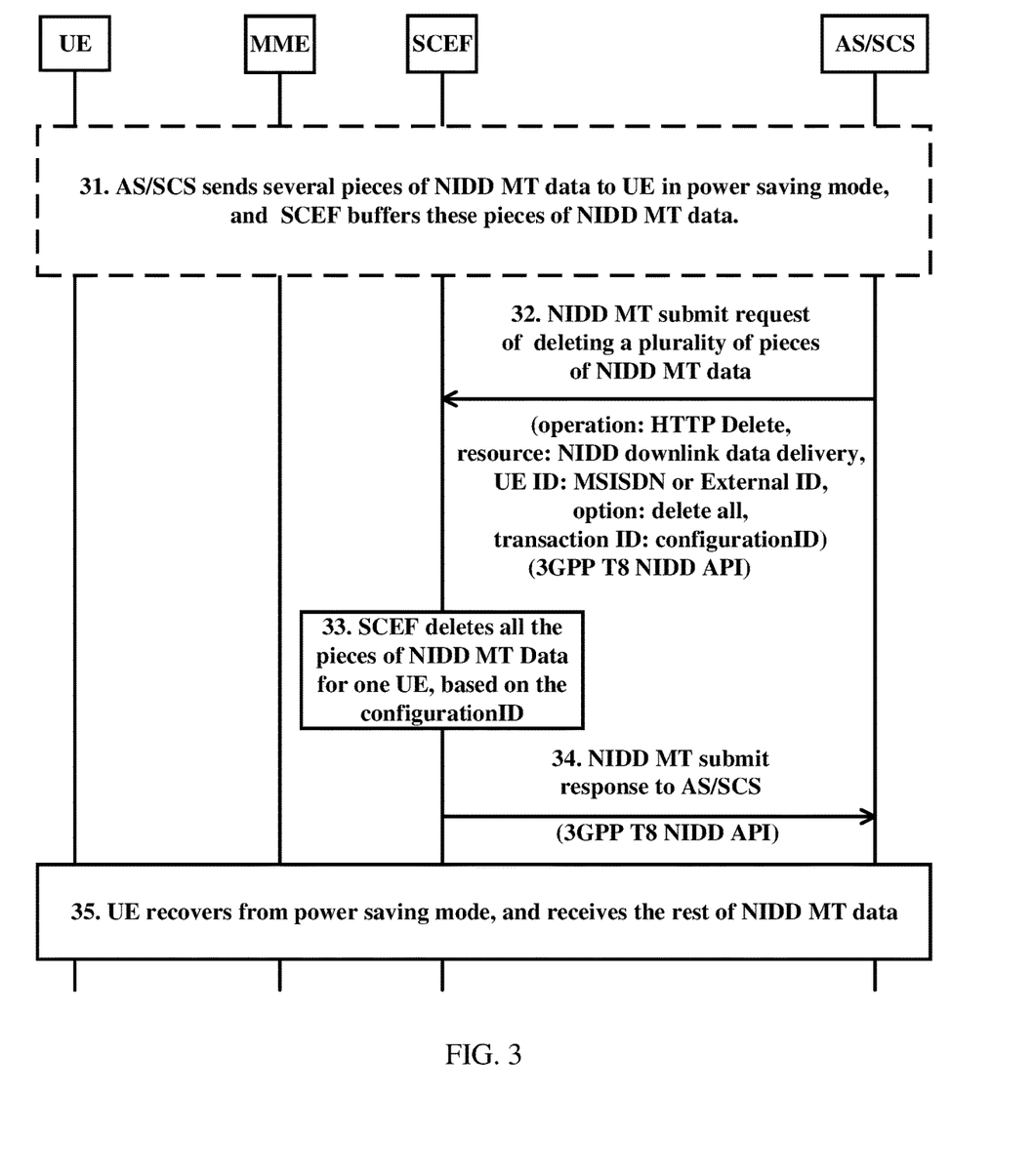
FIG. 3 is an exemplary procedure diagram associated with the method in FIG. 2.

FIG. 3 is an exemplary procedure diagram associated with the method in FIG. 2. As shown in FIG. 3, the method of FIG. 2 is implemented in a SCEF in a communication system as shown in FIG. 1. The method of FIG. 2 may be also implemented in any other network exposure node, such as a network exposure function (NEF) node, etc., without limitation.

As shown in FIG. 3, in step 31, AS/SCS sends several pieces of NIDD MT data to UE sleeping in power saving mode, and SCEF buffers these pieces of NIDD MT data. The specific procedures for each piece of NIDD MT data may be the same as the steps 1-5 as in FIG. 1. NIDD MT data in FIG. 3 is an exemplary type of NIDD data.

Steps 32-33 show a specific example of implementing steps 210-220 in FIG. 2 by the SCEF.

In step 32, the SCEF receives a request for operating the buffered data. Operating the buffered data may include: deleting a plurality of pieces of NIDD data. The plurality of pieces of NIDD data may comprise all pieces of NIDD data corresponding to a transaction identifier included in the request. Namely, operating the data according to the request comprising: deleting all the pieces of NIDD data corresponding to the transaction identifier.

For example, all the pieces of NIDD data from the given AS/SCS to the given UE may be associated with the same configurationID. The usage of the configurationID may indicate deleting all these pieces of NIDD data explicitly. The configurationID may facilitate the efficiency to determine the pieces of NIDD data to be deleted.

Alternatively, the AS/SCS ID, and the UE ID may be used to determine the pieces of NIDD data to be deleted. The SCEF may directly search all the buffered pieces of NIDD data with the AS/SCS ID, and the UE ID, to determine the pieces of NIDD data to be deleted.

The request may have several parameters including: operation: HTTP Delete, resource: NIDD downlink data delivery, UE ID: MSISDN or External ID, option: delete all, transaction ID: configurationID. HTTP is hypertext transfer protocol. Such parameter definitions may be compatible with the existing request message defined in 3GPP standard specifications, thus no new message format is needed for the present disclosure.

More specifically, table 1 is the proposed HTTP Delete method for the plurality of pieces of NIDD MT data, on the basis of 3GPP TS 29.122 V2.0.0 NIDD API, wherein URI is a uniform resource identifier.

TABLE 1

Description of HTTP Delete method

| Resource name | Resource URI | HTTP method name | HTTP initiator | Meaning |
| --- | --- | --- | --- | --- |
| NIDD downlink data deliveries | 3gpp-nidd/v1/{scsAsId}/ configurations/ {configurationId}/ downlink-data-deliveries | DELETE | SCS/AS | Delete all pending NIDD downlink data delivery resources related to a particular NIDD configuration resource. |

With the similar API definition, the proposed HTTP Delete method may be accessed via the same way as the existing methods about NIDD. The efficiency is thus improved.

In step 33, the SCEF operates the buffered data. For example, according to the request received in step 32, the SCEF may determine the pieces of NIDD data to be deleted from the buffer sequence of the non delivered (pending) pieces of NIDD data, based on configurationID. Then the SCEF deletes all the pieces of NIDD data related to the same configurationID. Then, in step 34, the SCEF sends a response to the request for operating the buffered data, to the AS/SCS. The response may include a result of deleting the plurality of pieces of NIDD data.

In step 35, the UE recovers from the power saving mode, and receives the rest of NIDD MT data. The specific procedures for each piece of NIDD MT data may be the same as the steps 6-11 as in FIG. 1.

After deleting undesired data which is already buffered in the SCEF, the UE will only receive the desired message and acts predictably.

Figure 4:
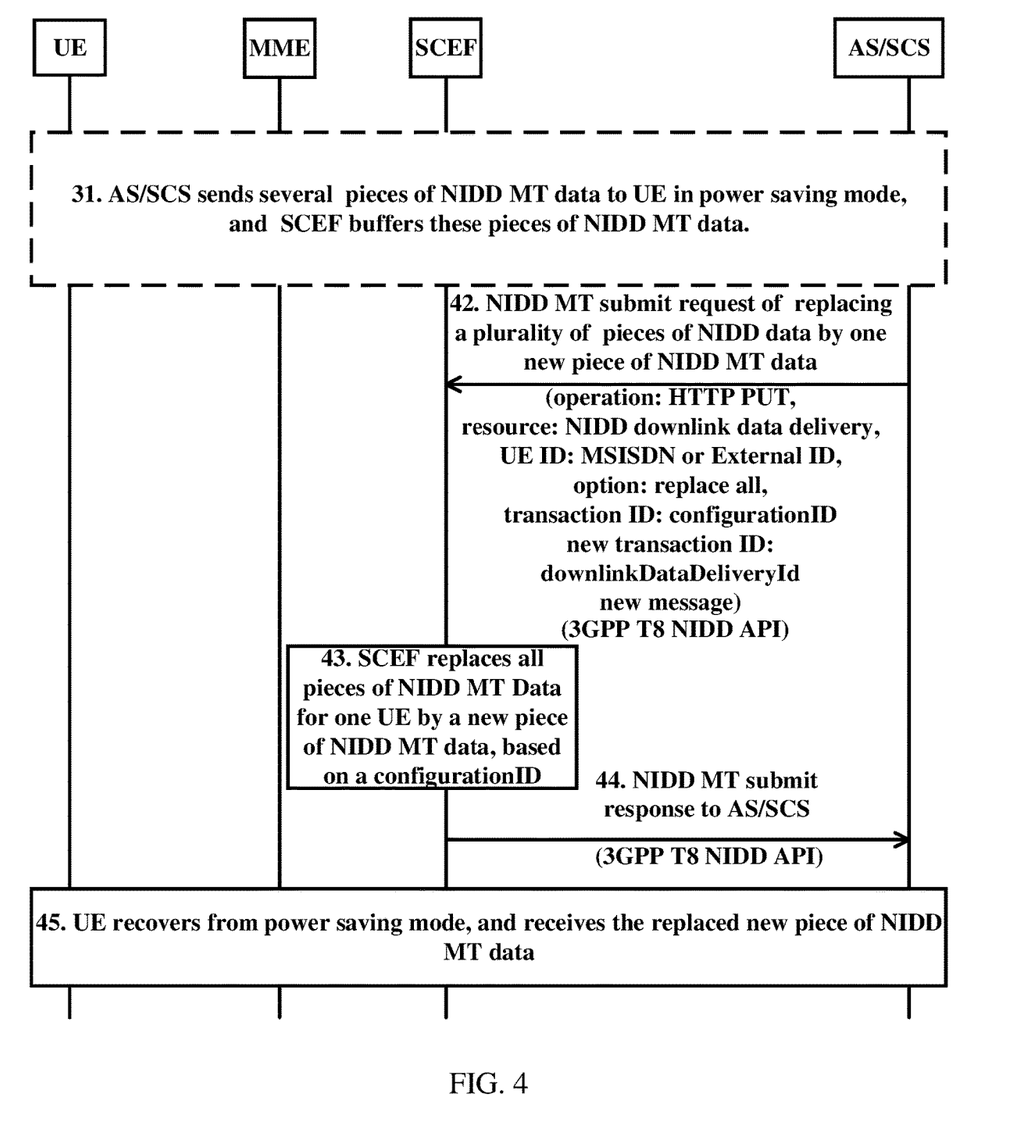
FIG. 4 is another exemplary procedure diagram associated with the method in FIG. 2.

FIG. 4 is another exemplary procedure diagram associated with the method in FIG. 2. As shown in FIG. 4, step 31 is the same as in FIG. 3. Steps 42-43 show another specific example of implementing steps 210-220 in FIG. 2 by the SCEF. NIDD MT data in FIG. 4 is an exemplary type of NIDD data.

In step 42, the SCEF receives a request for operating the buffered data. The operating the buffered data may include: replacing all the pieces of NIDD data corresponding to the transaction identifier with another piece of NIDD data.

When replacing the plurality of pieces of NIDD data, one transaction identifier related to all of the plurality of pieces of NIDD data may be used. Such transaction identifier may be a configurationID. For example, all the pieces of NIDD data from the given AS/SCS to the given UE may be associated with the same configurationID. The usage of the configurationID may indicate replacing all these pieces of NIDD data explicitly. The configurationID may facilitate the efficiency to determine the pieces of NIDD data to be replaced.

The request may have several parameters including: operation: HTTP PUT, resource: NIDD downlink data delivery, UE ID: MSISDN or External ID, option: replace all, transaction ID: configurationID, new transaction ID: downlinkDataDeliveryId, new message. Such parameter definitions may be compatible with the existing request message defined in 3GPP standard specifications, thus no new message format is needed for the present disclosure. Further, as an example, the existing method named "HTTP PUT" may be used compatibly with the existing request message. However, a new name such as "HTTP Replace" may be used alternatively.

More specifically, table 2 is the proposed HTTP Replace method for the plurality of pieces of NIDD MT data, on the basis of 3GPP TS 29.122 V2.0.0 NIDD API.

TABLE 2

Description of HTTP Replace method

| Resource name | Resource URI | HTTP method name | HTTP initiator | Meaning |
|---|---|---|---|---|
| NIDD downlink data deliveries | 3gpp-nidd/v1/ {scsAsId}/ configurations/ {configurationId}/ downlink- data-deliveries | PUT | SCS/ AS | Replace all pending NIDD downlink data delivery resources related to a particular NIDD configuration resource. |

With the similar API definition, the proposed HTTP Replace method may be accessed via the same way as existing methods about NIDD. The efficiency is thus improved.

In step 43, the SCEF operates the buffered data. For example, according to the request received in step 42, the SCEF may determine the pieces of NIDD data to be replaced from the buffer sequence of the non-delivered (pending) pieces of NIDD data, based on the same configurationID. The SCEF replaces these pieces of NIDD data with a new piece of NIDD data. Then, in step 44, the SCEF sends the response to the request for operating the buffered data, to the AS/SCS. The response may include a result of replacing the plurality of pieces of NIDD data.

In step 45, the UE recovers from the power saving mode, and receives the replaced new message. Therefore, after replacing the undesired data which is already buffered in the SCEF, the UE will only receive the desired message and acts predictably.

Figure 5:
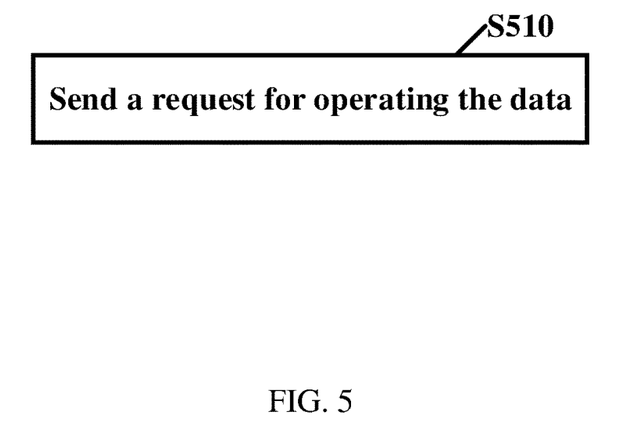
FIG. 5 is another exemplary flow chart showing a method for operating buffered data including non-IP data delivery by the AS/SCS in FIG. 3 or FIG. 4.

FIG. 5 is another exemplary flow chart showing a method for operating buffered data including non-IP data delivery by the AS/SCS in FIG. 3 or FIG. 4. As shown in FIG. 5, the method includes: step S510, sending a request for operating the data. The data comprises a plurality of pieces of NIDD data, which are buffered in the network and not delivered.

This method may be implemented by the AS/SCS to cooperate with the method in FIG. 2 implemented by the SCEF. Specifically, step S510 may correspond to step 32 in FIG. 3 or step 42 in FIG. 4.

With above described methods, it is an obvious advantage that the disclosure proposes a method for an application server with an easier way to delete or replace all non-delivered pieces of NIDD MT data to a given UE, which sleeps in power saving mode, such that the application server can deliver the latest expected message to the UE. Meanwhile, this disclosure offload SCEF's buffer, since undesired NIDD MT data can be deleted or replaced timely, thus, unnecessary messages to a radio base station and UE are avoided, and the energy in network and UE is saved. 3GPP T8 interface APIs defined in 3GPP TS 29.122 V2.0.0, etc. may be extended accordingly.

Figure 6:
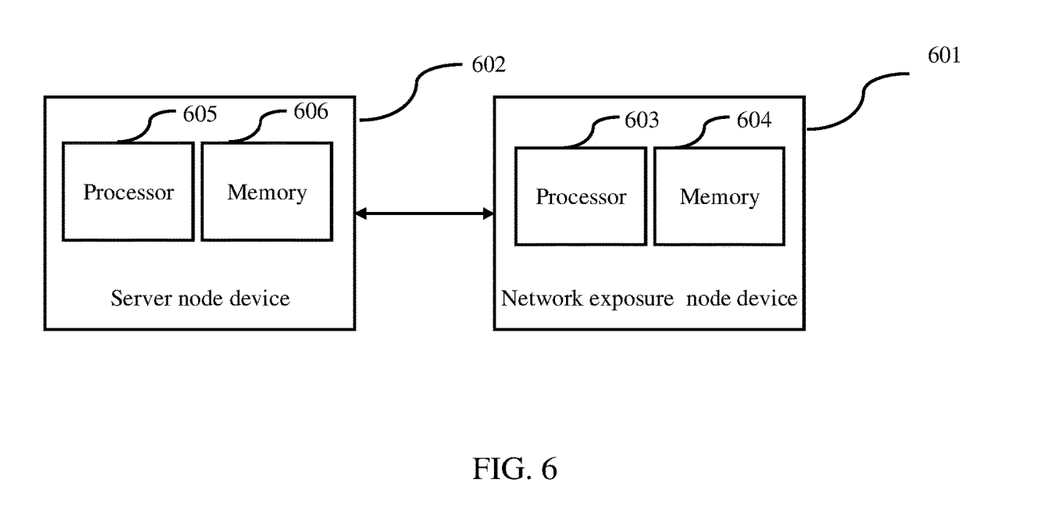
FIG. 6 is a block diagram showing the network exposure node device and the server node device in accordance with some embodiments.

FIG. 6 is a block diagram showing a network exposure node device and a server node device in accordance with some embodiments.

As shown in FIG. 6, a network exposure node device 601 may include a processor 603 and a memory 604. The memory 604 contains instructions executable by the processor 603. The network exposure node device 601 is operative to perform the methods described above, such as the method shown in FIG. 2. As shown in FIG. 6, a server node device 602 may include a processor 605 and a memory 606. The memory 606 contains instructions executable by the processor 605. The server node device 602 is operative to perform the methods described above, such as the methods shown in FIG. 5. For example, the server node device 602 may be an AS node device, an SCS node device, or an AF node device.

The embodiments of the present disclosure further provides a computer readable storage medium having a computer program stored thereon. The computer program is executable by a device to cause the device to carry out the method described above, such as the method shown in FIG. 2 or 5.

In FIG. 6, the processor 603 and the processor 605 may be any kind of processing component, such as one or more microprocessor or microcontrollers, as well as other digital hardware, which may include digital signal processors (DSPs), special-purpose digital logic, and the like. The memory 604 and the memory 606 may be any kind of storage component, such as read-only memory (ROM), random-access memory, cache memory, flash memory devices, optical storage devices, etc.

Figure 7:
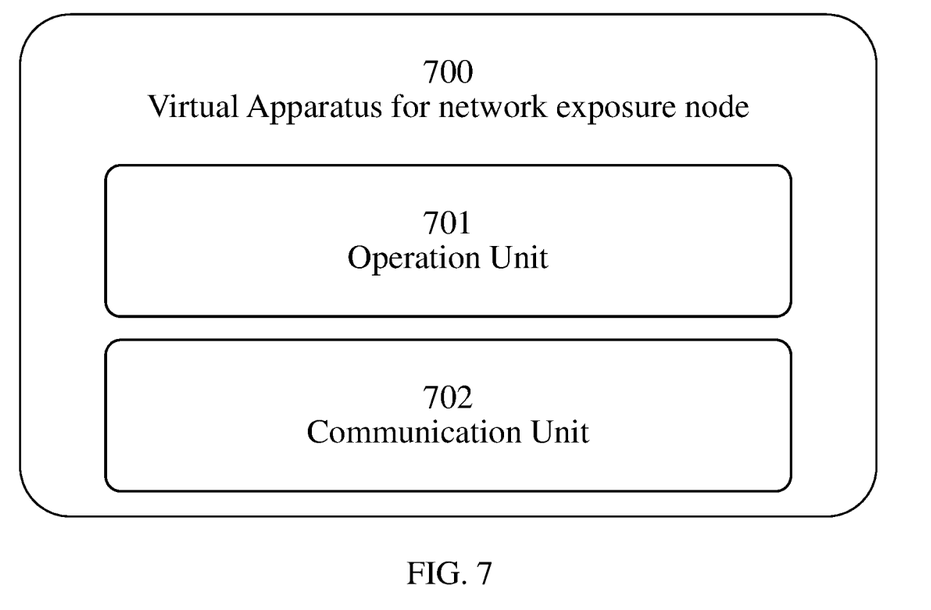
FIG. 7 is a schematic showing virtual apparatus for the network exposure node in accordance with some embodiments.

FIG. 7 is a schematic showing a virtual apparatus for the network exposure node in accordance with some embodiments.

A virtual apparatus 700 may perform the methods as shown in the FIG. 2. As an example, the virtual apparatus 700 for the network exposure node includes an operation unit 701, and a communication unit 702. Taking the method in FIG. 2 as an example, the operation unit 701 may perform step S220 of FIG. 2. The communication unit 702 may perform steps S210 of FIG. 2 or 34 of FIG. 3, and 44 of FIG. 4.

Figure 8:
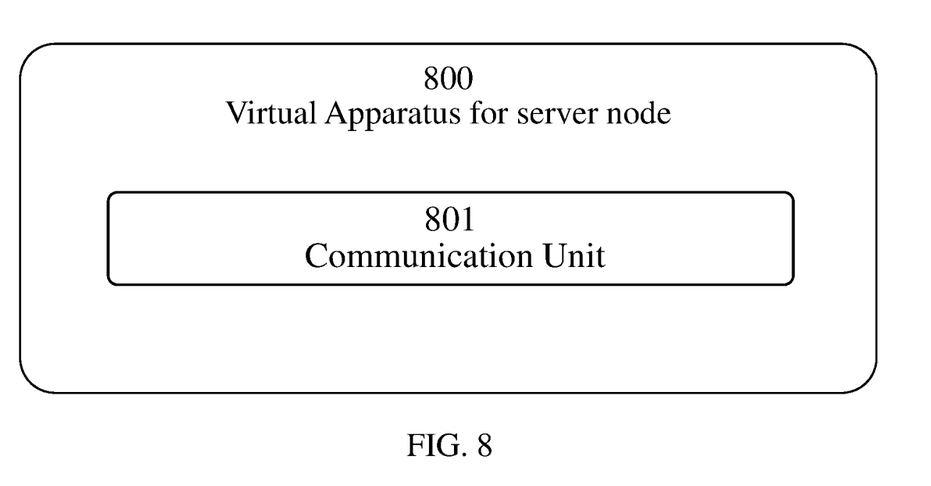
FIG. 8 is a schematic showing virtual apparatus for the server node in accordance with some embodiments.

FIG. 8 is a schematic showing a virtual apparatus for the server node in accordance with some embodiments.

A virtual apparatus 800 may performs the method as shown in FIG. 5. As shown in FIG. 8, virtual apparatus 800 for the server node may include a communication unit 801. Taking the method in FIG. 5 as an example, the communication unit 801 may perform steps S510, and then receive a possible response.

With virtual apparatuses 700 and 800, the network exposure node and server node may not need a fixed processor or memory, any computing resource and storage resource may be arranged from at least one node device in the network. The introduction of virtualization technology and network computing technology may improve the usage efficiency of the network resources and the flexibility of the network.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method for operating data by a network exposure node in a communication system, comprising:
   receiving a request for operating the data for a user equipment (UE), wherein the data is sent to the UE while sleeping in power saving mode;
   as long as the UE is in the power saving mode, operating the data according to the request; wherein the data comprises a plurality of pieces of non-internet protocol data delivery (NIDD) data, which are buffered in a network and not delivered to the UE, wherein the plurality of pieces of NIDD data to be operated are identified based at least on a UE identifier included in the request; and
   after operating the data comprising the plurality of pieces of NIDD data already buffered in the network, delivering the rest of NIDD data that is not buffered to the UE after it is determined that the UE has recovered from the power saving mode.

2. The method according to claim 1, wherein the plurality of pieces of NIDD data comprises all pieces of NIDD data corresponding to a transaction identifier included in the request.

3. The method according to claim 2, wherein operating the data according to the request comprising: deleting all the pieces of NIDD data corresponding to the transaction identifier.

4. The method according to claim 2, wherein operating the data according to the request comprising: replacing all the pieces of NIDD data corresponding to the transaction identifier with another piece of NIDD data.

5. The method according to claim 2,
   wherein the request is received via a T8 interface; and
   wherein the transaction identifier is a configuration identifier (configurationID).

6. The method according to claim 1 further comprising: sending a response to the request to a server node.

7. The method according to claim 1, wherein the network exposure node is one of: a service capability exposure function (SCEF) node, and a network exposure function (NEF) node.

8. The method according to claim 1, wherein an originator of the plurality of pieces of NIDD data is one of: an application server (AS) node, a service capability server (SCS) node, and an application function (AF) node.

9. The method according to claim 1, wherein a terminator of the plurality of pieces of NIDD data is the user equipment.

10. The method according to claim 1, wherein a terminator of the plurality of pieces of NIDD data is a group of user equipment.

11. A method for operating data by a server node in a communication system, comprising:
   sending a request for operating the data to a network exposure node;
   wherein the request for operating the data is for a user equipment (UE), the data is sent to the UE while sleeping in power saving mode, such that the data is operated according to the request as long as the UE is in the power saving mode,
   wherein the data comprises a plurality of pieces of non-internet protocol data delivery (NIDD) data, which are buffered in a network and not delivered to the UE,
   wherein the plurality of pieces of NIDD data to be operated are identified based at least on a UE identifier included in the request,
   wherein after the data comprising the plurality of pieces of NIDD data already buffered in the network is operated, the rest of NIDD data that is not buffered is delivered to the UE after it is determined that the UE has recovered from the power saving mode.

12. The method according to claim 11, wherein the plurality of pieces of NIDD data comprises all pieces of NIDD data corresponding to a transaction identifier included in the request.

13. The method according to claim 12, wherein operating the data comprising: deleting all the pieces of NIDD data corresponding to the transaction identifier.

14. The method according to claim 12, wherein operating the data according to the request comprising: replacing all the pieces of NIDD data corresponding to the transaction identifier with another piece of NIDD data.

15. The method according to claim 12,
wherein the request is sent via a T8 interface; and
wherein the transaction identifier is a configuration identifier.

16. A network exposure node device comprising:
a processor; and
a memory, containing instructions executable by the processor;
wherein the network exposure node device is operative to the method according to claim 1.

17. The network exposure node device according to claim 16, wherein the network exposure node device is one of: a service capability exposure function (SCEF) node device, and a network exposure function (NEF) node device.

18. A server node device comprising:
a processor; and
a memory, containing instructions executable by the processor;
wherein the server node device is operative to the method according to claim 11.

19. The server node device according to claim 18, wherein the server node device is one of: an application server (AS) node device, a service capability server (SCS) node device, and an application function (AF) node device.

20. A non-transitory computer readable storage medium having a computer program stored thereon, the computer program executable by a device to cause the device to carry out the method according to claim 1.

21. A non-transitory computer readable storage medium having a computer program stored thereon, the computer program executable by a device to cause the device to carry out the method according to claim 11.

* * * * *